United States Patent
Fukuzawa (10) Patent No.: US 7,010,105 B2
(45) Date of Patent: Mar. 7, 2006

(54) FORMAT-CONVERTING DEVICE AND PRIVATE BRANCH EXCHANGE SYSTEM USING THE SAME, AND FORMAT-CONVERTING METHOD AND MEMORY MEDIUM STORING A PROGRAM TO ALLOW COMPUTER TO EXECUTE THE SAME METHOD

(75) Inventor: Yasuhide Fukuzawa, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 728 days.

(21) Appl. No.: 10/098,820

(22) Filed: Mar. 15, 2002

(65) Prior Publication Data

US 2002/0149978 A1 Oct. 17, 2002

(30) Foreign Application Priority Data

Mar. 15, 2001 (JP) .......................... 2001-073744

(51) Int. Cl.
H04M 1/00 (2006.01)

(52) U.S. Cl. ..................... 379/156; 379/157; 379/231
(58) Field of Classification Search ............... 379/156, 379/157, 158, 159, 160, 231, 242, 243
See application file for complete search history.

(56) References Cited

U.S. PATENT DOCUMENTS 6,078,650 A * 6/2000 Hansen ..................... 379/52
6,598,098 B1 * 7/2003 Agami et al. ............. 710/29
2001/0003538 A1 6/2001 Sakata

FOREIGN PATENT DOCUMENTS

JP 11-27428 A 1/1999
JP 2001-156905 A 6/2001

* cited by examiner

Primary Examiner—Ahmad F. Matar
Assistant Examiner—Quynh H. Nguyen
(74) Attorney, Agent, or Firm—RatnerPrestia (57) ABSTRACT

A format-converting device couples a control device controlling an extension with a private branch exchange (PBX). A memory stores a converting table, which brings a first command data into correspondence with a given function and stores the first command data and the given function, a telephony application programming interface (TAPI) function and a telephony service provider interface (TSPI) function. A converting section calculates the given function based on the received first command data referring to the converting table. A first calculating section calculates the TAPI function. A second calculating section calculates the TSPI function. The first calculating section calculates based on a calculated result of the converting section. The second calculating section produces a second command data based on a calculated result of the first calculating section, where the second command data differs from the first command data. The second command data is sent to the PBX.

20 Claims, 5 Drawing Sheets

| NO. | Field | Start | Length | Trigger | Type | Delimiter | Field No. | Start Pat | Edit Pat |
|---|---|---|---|---|---|---|---|---|---|
| 1 | Trigger | 1 | 9 | FOSMW | Fixed | | | | |
| 2 | Extension | 12 | 4 | | Fixed | | | | |
| 3 | Extension2 | 18 | 14 | | Fixed | | | | |

Description: Message Lamp On
Destination: PBX ▽
Command Name: MWL On ▽

[New] [Edit] [Delete]

[Save] [Cancel]

FIG. 3

| Description | Trigger | | Type | Fixed Position ▼ |

General
- Start Position: 1
- Length: 9
- Mask: None ▼

Trigger
- Compare Type: Equal To ▼
- Compare Pattern: FOSMWL ON
- Trigger Pattern2:

[Save] [Cancel]

FORMAT-CONVERTING DEVICE AND PRIVATE BRANCH EXCHANGE SYSTEM USING THE SAME, AND FORMAT-CONVERTING METHOD AND MEMORY MEDIUM STORING A PROGRAM TO ALLOW COMPUTER TO EXECUTE THE SAME METHOD

FIELD OF THE INVENTION

The present invention relates to a format-converting device and a private branch exchange system using the same.

BACKGROUND OF THE INVENTION

Recently, most hotel-management-works such as reception, reservation, check in, check out, are operated by a hotel-management system using a computer. A computer system controlling mainly hotel-management-works at a reception desk is called front office system (FOS) hereinafter.

A FOS controls a private branch exchange (PBX) and the like besides the hotel-management-works mentioned above. In general, a management system of a FOS (a FOS management system) communicates with a PBX, and controls a PBX with a command of ASCII code.

Recently, computers have progressed remarkably. A FOS has accumulated a large amount of hotel-management know-how for many days, e.g., circumstances of a hotel, customer's requirements. As a result, changing an old model of FOS management system to new one causes some troubles, and an old model of FOS management system is obliged to remain in the hotel.

On the other hand, the latest PBX can supply various services, so that a large number of old PBXs are replaced with new ones at hotels.

However, refurbishing a FOS management system for using a new PBX is complicated and troublesome. Because a large number of PBX manufacturing companies have developed PBXs and interfaces by their original command-systems and -methods, new PBXs are poorly compatible with conventional FOS management systems.

Most present FOS management systems have conventional OS or application software, and do not match a new PBX. As a result, when the new PBX is connected to a FOS management system, the following problem occurs. Even if the same ASCII codes are used for the PBX and the FOS management system as command data, description forms of command data of the PBX are different from that of the FOS management system. The new PBX thus can not recognize information or an order supplied from the FOS management system, and can not receive them. The FOS management system can not recognize information or an order supplied from the new PBX either. In a word, the new PBX and the conventional FOS management system can not work in cooperation with each other.

SUMMARY OF THE INVENTION

The present invention aims to provide a format-converting device and a private branch exchange (PBX) system using the format-converting device, where the format-converting device achieves high compatibility by calling a given function through using a command data in a specified code.

The present invention further aims to provide a format-converting method and a memory medium storing a program to allow a computer to execute the format-converting method.

The format-converting device of this invention includes the following elements:

(a) a first sending and receiving section for receiving a first command data and sending a second command data, (b) a memory for storing a converting table, which stores a first command data and a given function corresponding to the first command data, a telephony application programming interface (TAPI) function and a telephony service provider interface (TSPI) function, (c) a converting section referring to the converting table based on the received first command data and calculating a given function, where when the converting section receives a data based on a second command data, the converting section changes the data to a first command data, (d) a first calculating section calculating a TAPI function, (e) a second calculating section calculating a TSPI function, (f) a controller allowing the first calculating section to calculate based on a calculated result of the converting section, and allowing the second calculating section to calculate based on a calculated result of the first calculating section, and producing a second command data different from the first command data, where when the format-converting device receives the second command data from the PBX, the first calculating section calculates based on a calculated result of the second calculating section, and the converting section supplies the first command data based on the calculated result of the first calculating section, and (g) a second sending and receiving section sending the second command data to the PBX and receiving another second command data from the PBX.

The PBX system of this invention includes the following elements:

(a) the format-converting device mentioned above, (b) a control device controlling a management system including extension-management, (c) a PBX.

The format-converting method of this invention includes the following steps:

(a) receiving a first command data, (b) calculating a selected TAPI function based on the first command data from a converting table, which stores a first command data and a given TAPI function corresponding to the first command data, (c) selecting a TSPI function based on a calculated result of the step (b), (d) calculating a selected TSPI function based on the first command data, (e) producing a second command data based on a result of the step (d), and (f) sending the second command data.

The computer readable memory medium of this invention storing a program to allow a computer to execute the format-converting method mentioned above.

DESCRIPTION OF THE PREFERRED EMBODIMENTS

Exemplary embodiments of the present invention are demonstrated hereinafter with reference to the accompanying drawings.

In these embodiments, a computer system controlling hotel-management-works at a reception desk is called front office system (FOS).

A system of the embodiment of the present invention including following elements will be described:

(a) a format-converting device, (b) a private branch exchange (PBX) system for controlling hotel-management-works at a reception desk through using the format-converting device, (c) a program for converting a format of ASCII code, and (d) a computer readable memory medium for storing the program.

Figure 1:
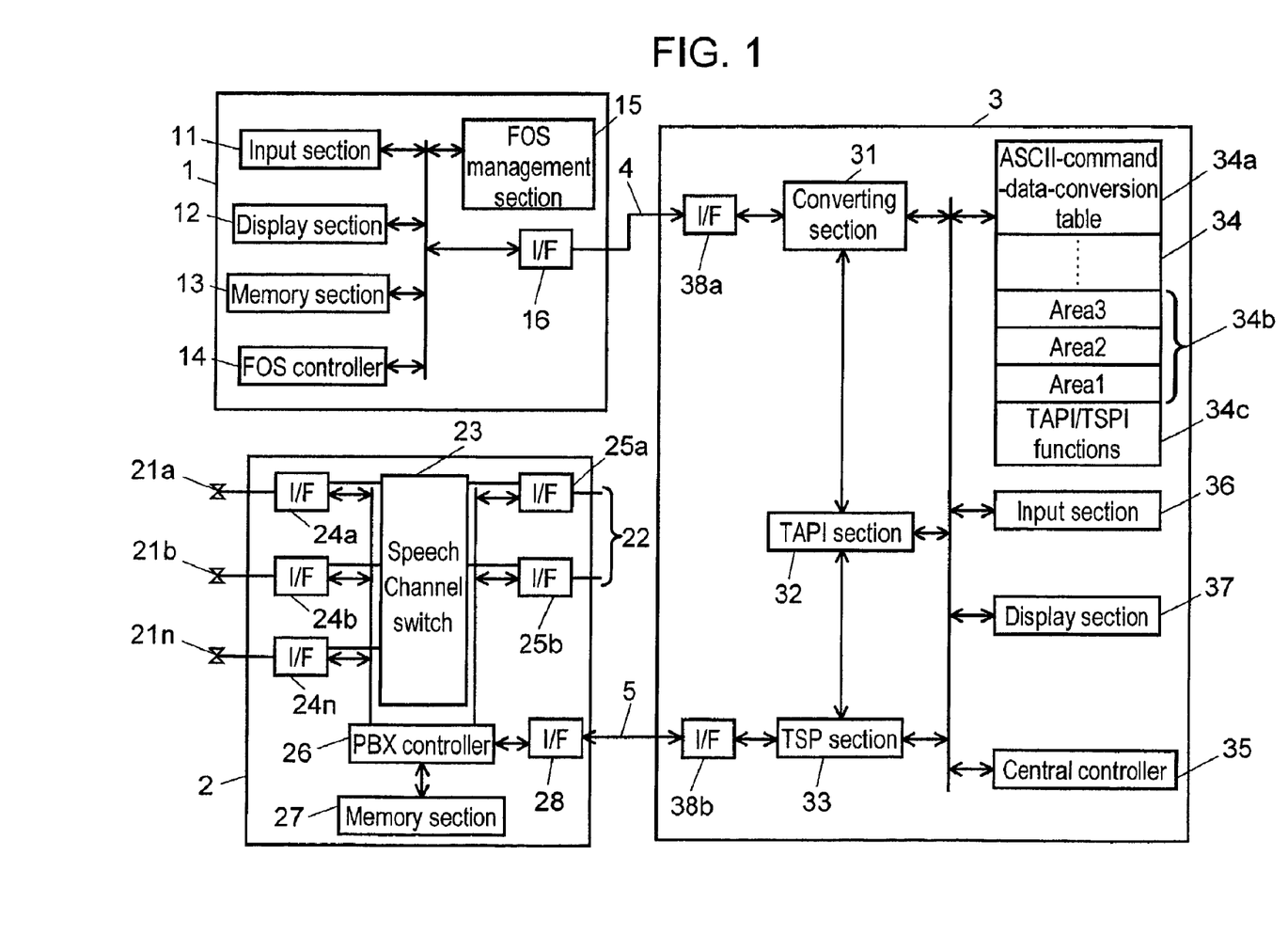
FIG. 1 shows a structure of a format-converting device and a private branch exchange (PBX) system in accordance with an exemplary embodiment of the present invention.

FIG. 1 shows a structure of a format-converting device and a private branch exchange (PBX) system in accordance with the exemplary embodiment of the present invention.

Figure 2:
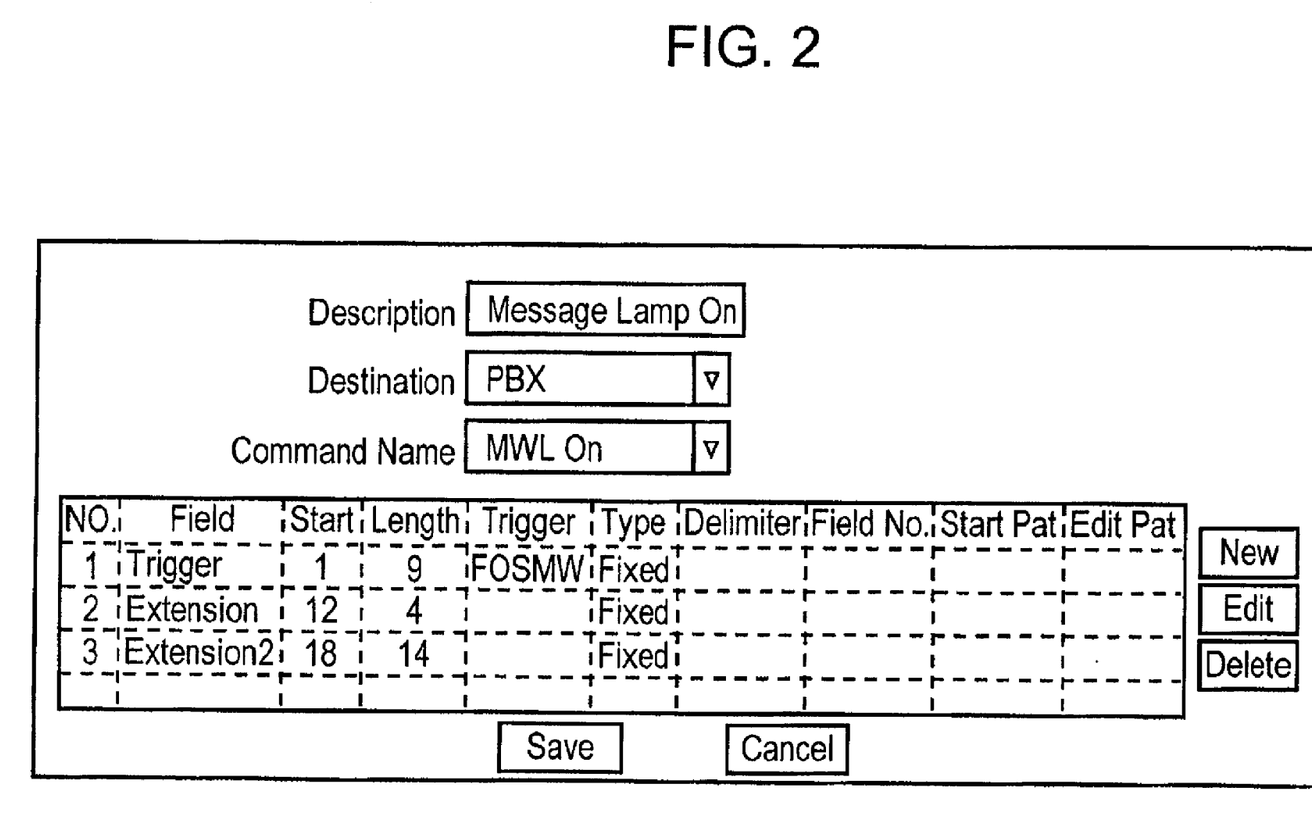
FIG. 2 shows a first input screen of an ASCII-command-data-converting table bringing a first ASCII-command-data into correspondence with a TAPI function in accordance with the embodiment of the present invention.

FIG. 2 shows a first input screen of an ASCII-command-data-converting table bringing a first ASCII-command-data into correspondence with a TAPI function in accordance with the embodiment of the present invention.

Figure 3:
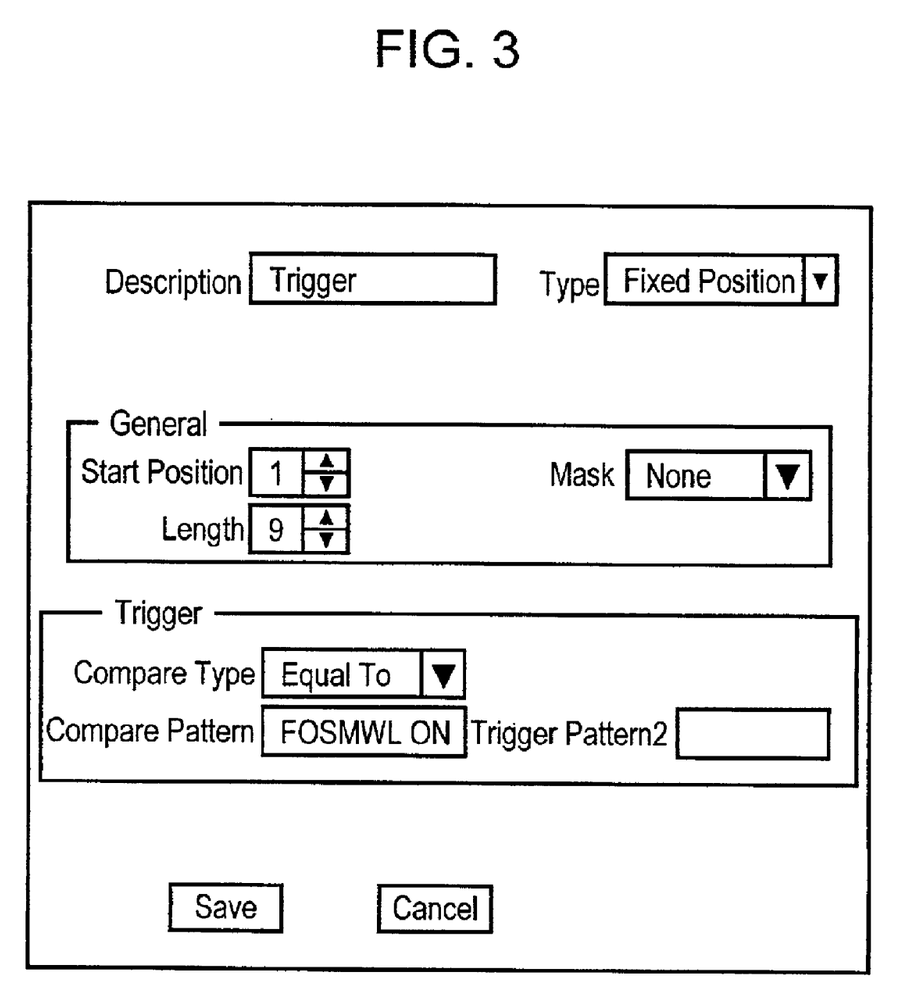
FIG. 3 shows a second input screen of an ASCII-command-data-converting table bringing a first ASCII-command-data into correspondence with a TAPI function in accordance with the embodiment of the present invention.

FIG. 3 shows a second input screen of an ASCII-command-data-converting table bringing a first ASCII-command-data into correspondence with a TAPI function in accordance with the embodiment of the present invention.

Figure 4:
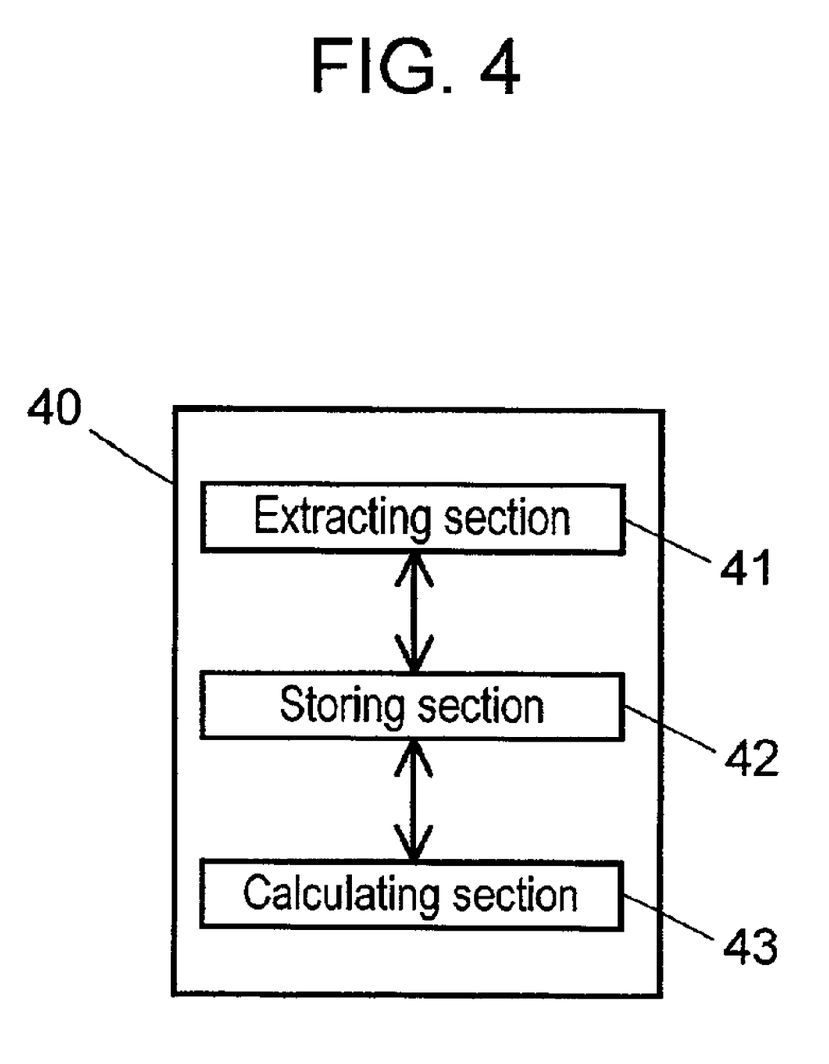
FIG. 4 shows a schematic view illustrating a structure of a memory medium in accordance with the embodiment of the present invention.

FIG. 4 shows a schematic view illustrating a structure of a memory medium in accordance with the embodiment of the present invention.

Figure 5:
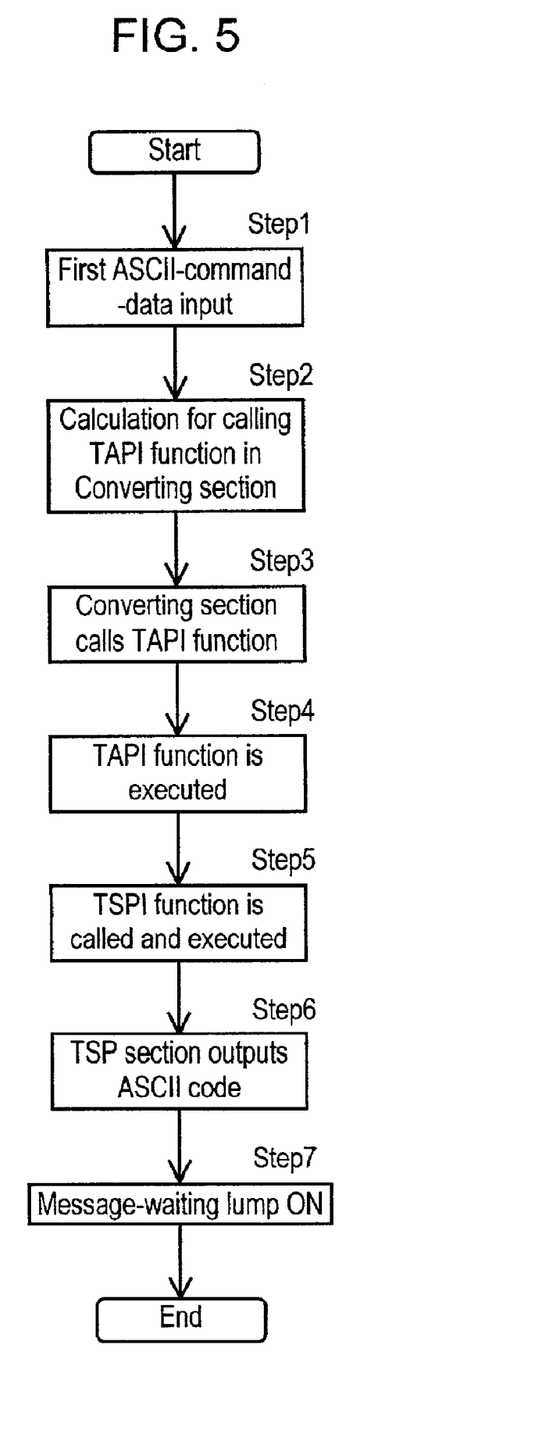
FIG. 5 shows a flowchart illustrating processes of turning on a message-waiting lamp starting with inputting data into a FOS management system in the PBX system in accordance with the embodiment of the present invention.

FIG. 5 shows a flowchart illustrating processes of turning on a message-waiting lamp from a FOS management system in the PBX system in accordance with the embodiment of the present invention.

Figure 6:
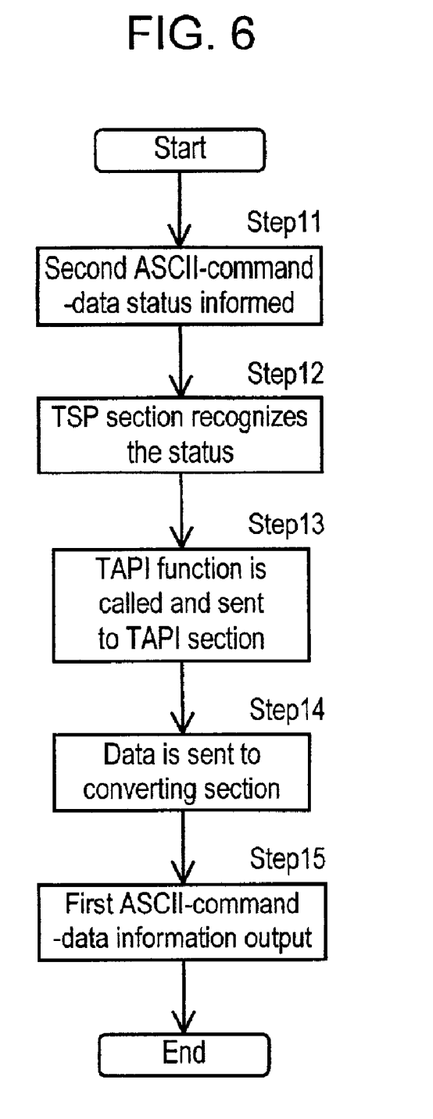
FIG. 6 shows a flowchart illustrating processes of informing "ON" of the message-waiting lamp from a PBX to the FOS management system in the PBX system in accordance with the embodiment of the present invention.

FIG. 6 shows a flowchart illustrating processes of informing "ON" of the message-waiting lamp from a PBX to the FOS management system in the PBX system in accordance with the embodiment of the present invention.

In FIG. 1, FOS management system 1 operates hotel-management-works such as management of service conditions of hotel-extensions or billing data at a reception desk.

PBX 2 connects hotel-extensions to outside lines, or provides services of voice mails and the like.

Format-converting device 3 executes the following operation:

1) Format-converting device 3 receives a command data of ASCII code written in a first description form (a first ASCII-command-data), and converts the first ASCII-command-data into a command data which PBX 2 can understand. The changed command data discussed above is a command data of ASCII code written in a second description form (a second ASCII-command-data).

2) Format-converting device 3 receives a command data written in the second description form from PBX 2, and changes the command data into a command data written in the first description form which FOS management system 1 can understand.

The first description form is different from the second description form.

RS-232C cable 4 serially transmits the first ASCII-command-data between FOS management system 1 and format-converting device 3. RS-232C cable 5 transmits the second ASCII-command-data between PBX 2 and format-converting device 3.

A structure of FOS management system 1 is described hereinafter. Input section 11 is a keyboard and the like placed at FOS management system 1. A data is supplied from input section 11 to graphical user interface (GUI) and the like supplied from FOS controller 14. According to this input data, FOS management system 1 supplies a first ASCII-command-data to format-converting device 3 for controlling PBX 2.

Display section 12 operates a display such as a CRT.

Memory section 13 stores various kinds of data of FOS management system 1. FOS controller 14 controls each section of FOS management system 1. FOS management section 15 controls a hotel data in FOS management system 1. RS-232C interface (I/F) 16 sends and receives a first ASCII-command-data via RS-232C cable 4 between FOS management system 1 and format-converting device 3.

FOS management section 15, which includes an application program for management of FOS, operates hotel-management-works at a reception desk.

A structure of PBX 2 is described hereinafter.

PBX 2 is connected to hotel-extensions 21a, 21b through 21n and outside line 22.

Speech channel switch 23 controls switching between hotel-extensions 21a, 21b through 21n and outside line 22. Extension-circuits I/Fs 24a, 24b through 24n are provided between hotel-extensions I/Fs 21a, 21b through 21n and speech channel switch 23. Outside-line circuits I/Fs 25a, 25b are prepared between outside line 22 and speech channel switch 23.

PBX controller 26 controls speech channel switch 23, extension-circuits I/Fs 24a, 24b through 24n and outside-line circuits I/Fs 25a, 25b, and exchanges a control data with FOS management system 1. Memory section 7 stores a data for controlling PBX 2.

RS-232C interface (I/F) 28 sends and receives a second ASCII-command-data between format-converting device 3 and PBX 2.

An operation of PBX 2 is described hereinafter. FOS management system 1 sends a command data to format-converting device 3 for prohibiting a calling of hotel-extension 21a.

At that time, format-converting device 3 sends a second ASCII-command-data to PBX controller 26. PBX controller 26 receives and analyzes the data. PBX controller 26 then controls PBX 2, and allows PBX 2 to send an error sound to hotel-extension 21a responding to a calling requirement from extension 21a.

When a message-waiting lamp turns on, FOS management system 1 also sends a command data to format-converting device 3. According to the data, format-converting device 3 sends a second ASCII-command-data to PBX controller 26.

FOS management system 1 controls PBX 2 via format-converting device 3 as discussed above.

A structure and an operation of format-converting device 3 of the first embodiment are described hereinafter. Format-converting device 3 includes converting section 31, telephony application programming interface (TAPI) section 32 and telephony service provider (TSP) section 33.

Converting section 31 receives a first ASCII-command-data, and converts the data to be able to call a TAPI function from memory section 34 and to be able to operate. TAPI section 32 calculates a TAPI function. Then TSP section 33 calls a telephony service provider interface (TSPI) function from memory section 34, and calculates a TSPI function. As a result, format-converting device 3 receives the first ASCII-command-data, and converts the first ASCII-command-data into a second ASCII-command-data, then supplies it.

Besides the operation discussed above, format-converting device 3 receives a second ASCII-command-data from PBX 2, and sends it to converting section 31 via TSP section 33 and TAPI section 32, then converting section 31 converts the data into a first ASCII-command-data. Converting section 31 sends the converted data to FOS management system 1.

Herein, TAPI is provided by Microsoft®. Microsoft Corporation supplies TAPI library of functions. TSPI specification is provided by Microsoft Cooperation.

An operation of each section of the format-converting device of this embodiment is described hereinafter.

First, converting section 31 selects a given command data from the first ASCII-command-data which is supplied from FOS management system 1 via interface (I/F) 38a, where the first ASCII-command-data corresponds to a data readable by PBX 2.

Second, converting section 31 converts the selected command data, so that a TAPI function can be ready to be called from memory 34 and TAPI section 23 can be ready to calculate.

Third, converting section 31 allows TAPI section 32 to calculate, format conversion is thus executed.

ASCII-command-data-conversion table 34a previously prepared is used as the format conversion.

In this embodiment, in order to call a TAPI function from the first ASCII-command-data, the first ASCII-command-data is temporarily replaced with a given function using ASCII-command-data-conversion table 34a, then an operation for calling the TAPI function is executed by calculating the given function.

ASCII-command-data-conversion table 34a is a conversion table showing a relation between first ASCII-command-data and a plurality of given TAPI functions. A condition of FOS management system 1 can be supplied using an input screen of display section 37 to the conversion table.

TAPI section 32 calculates the TAPI function called by converting section 31, and processes a TSPI function to be called. Besides TAPI, Novell's Telephony Services Application Programming Interface (TSAPI) can be used as TAPI section 32.

TSP section 33 calculates a TSPI function which is called by TAPI section 32 from memory section 34. TSP section 33 converts an input command into a second ASCII-command-data, and supplies the second ASCII-command-data for controlling PBX 2.

FIG. 2 shows an input screen of display section 37 for supplying necessary information of ASCII-command-data-conversion table 34a which brings a first ASCII-command-data into correspondence with a TAPI function.

An input screen of FIG. 2 shows the following operation. A first ASCII-command-data "FOSMWL ON 1001 1002" is selected, and a TAPI function lineDevSpecific (hline, dwAddressID, hCall, lpParams, dwSize) corresponding to the selected command-data is called from memory section 34.

Necessary information is supplied to ASCII-command-data-conversion table 34a for replacing the first ASCII-command-data with code FDS [Field 3 C] 36 [EXT_ SETMW] 3 [Field2 C] (command name: MWLOn) corresponding to an operation for calling the TAPI function to converting section 31.

The command-data can be revised to another command-data, and the TAPI function and the TSPI function can be changed by supplying a condition using the input screen.

A command name and an output-destination of a code corresponding to an ASCII-command-data are supplied using input section 36, where the code corresponds to a given TAPI function. Thus an output destination of the function and a function replaced with the first ASCII-command-data sent from FOS management system 1 are determined.

For example, in this case, a command name and an output-destination are supplied as "MWLOn" and "PBX" respectively.

Each "Field" is supplied according to the following definition for describing a command data.

1) When nine letters (as "Length") from a first letter (as "Start") to a ninth letter agreed with "FOSMWL ON", the command of "MWLOn" is operated.

2) Four letters (as "Length") from a twelfth letter (as "Start") are recognized as "Extension".

3) Four letters (as "Length") from a eighteenth letter (as "Start") are

Converting section 31 can include software called property-management-system (PMS)-interface software for sending an ASCII-command-data used in a hotel-management system and the like.

A code produced originally by a PBX maker is used as the second ASCII-command-data, and a standard code called computer-supported-telephony application (CSTA) is also used as the second ASCII-command-data.

Memory section 34 includes ASCII-command-data-conversion table 34a, data area 34b and data area 34c.

Data area 34b stores a given command data selected from command data of FOS management system 1. Data area 34c stores a plurality of TAPI functions, TSPI functions and other information.

Data of parameter, e.g., hline, dwAddressID, hCall, lpParams, dwSize, of TAPI functions are stored at area 1, area 2, area 3 . . . in data area 34b, where: hline shows the number of a line device showing an extension number;

dwAddressID shows an address ID of which fixed value is 0;

hCall shows a calling-handle value of which fixed value is 0;

lpParams shows a pointer value of a memory data area storing other necessary information; and dwSize shows a data area size of lpParams, and other necessary information is stored in a memory data area of dwSize.

Central controller 35 controls each section forming format-converting device 3. Input section 36 is an input device, e.g., keyboard. Display section 37 displays information on a display such as a CRT. RS-232C interface (I/F) 38a sends and receives a data between FOS management system 1 and format-converting device 3. RS-232C interface (I/F) 38b sends and receives a data between PBX 2 and format-converting device 3. recognized as "Extension2".

FIG. 3 is an another example of "Field"-input-screen, and each "Field" of FIG. 3 can be supplied more easily using GUI than that of FIG. 2.

For example, "FOSMWL ON 1001 1002" is supplied from FOS management system 1 to format-converting device 3 as a first ASCII-command-data. At that time, the first ASCII-command-data is replaced with a function of "MWLOn" FDS [Field 3 C] 36 [EXT_SETMW] 3 [Field2 C]. "1001" and "1002" are stored respectively in "Field2 C" and "Field3 C", and are passed to the TAPI function as data of a parameter or a "structure".

After the TAPI function is calculated, according to the calculated result, lineDevSpecific hline, dwAddressID, hCall, lpParams, dwSize of a TAPI function is called by converting section 31.

Then the TAPI function is calculated at TAPI section 32.

TSPI function TSPI lineDevSpecific (DRVRequest, hline, dwAddressID, hCall, lpParams, dwSize is called from memory section 34 by TSP section 33, and TSP section 33 calculates the TSPI function.

Necessary data of parameters (DRVRequest, hline, dwAddressID, hCall, lpParams, dwSize) are stored in data area 34b, where, DRVRequest shows the number which TSP section 33 determines randomly. Other parameters (hline, dwAddressID, hCall, lpParams, dwSize work in the same way as those of the TAPI function.

TSP section 33 reads necessary data from data area 34b, and calculates the TSPI function, then finishes a format-converting-operation. TSP section 33 thus supplies a resultant second-ASCII-command-data from RS-232C interface 38a to PBX 2. PBX controller 26 controls PBX 2 using the second ASCII-command-data.

Even if the different description of a command data is supplied from FOS management system 1, a TAPI function corresponding to a command data can be called using converting section 31.

A format-converting-operation, which includes steps of sending a confirming-message from PBX 2 to memory section 13 of FOS management system 1, is described hereinafter. A message written in the second ASCII-command-data is sent from PBX 2 to TSP section 33 via interface (I/F) and RS-232C interface 38b of format-converting device 3. TSP section 33 always monitors a message from PBX 2. When TSP section 33 receives a given message, TSP section 33 begins to operate.

TSP section 33 recognizes the given message, and calls a CallBack function (hline, hCall, dwMsg, dwParam1) of a TAPI function, where: "hline, hCall" work the same as those of the TAPI function;

"dwMsg" stores message information; and

"dwParam1" stores detailed message information.

TAPI section 32 calls a CallBack function (hline, hCall, dwMsg, dwParam1) of converting section 31 by using the CallBack function (hline, hCall, dwMsg, dwParam1) which is called by TSP section 33.

Converting section 31 supplies "PBXMWL ON 1001 1002" to FOS management system 1 as a first ASCII-command-data based on a result of a calculation of the CallBack function (hline, hCall, dwMsg, dwParam1). As a result, the message produced from PBX 2 is converted from a second ASCII-command-data into a first ASCII-command-data, and supplied to FOS management system 1, then noticed to an operator.

In this embodiment, a format-converting-operation operated at format-converting device 3 is executed by a program which works a computer as a converting section. The program is loaded to a computer from a computer readable memory medium storing the program.

As shown in FIG. 4, computer readable memory medium 40 stores the program. Extracting section 41 stores a program for extracting command contents and a necessary data from a command data written in ASCII code.

Storing section 42 has a program for storing command contents in data area 34b of memory section 34 or in ASCII-command-data-conversion table 34a.

Calculating section 43 receives a command data, then calls to calculate a TAPI function using ASCII-command-data-conversion table 34a which shows a relation between a command data written in an ASCII-command-data and a TAPI function.

A computer having memory medium 40 converts the command data written in an ASCII-command-data into TAPI data.

An operation worked at format-converting device 3 is described hereinafter with reference to a flowchart of FIG. 5 and FIG. 6.

Processes of turning on a message-waiting lamp starting with inputting data into FOS management system 1, and those processes are described with reference to FIG. 5.

In step 1, an operator turns on the message-waiting lamp of extension 1001 from input section 11 using GUI, and prepares extension 1002 for a return message.

FOS management system 1 receives the information from an operator, and sends it to format-converting device 3 as a first ASCII-command-data "FOSMWL ON 1001 1002", where: "FOSMWL ON" shows a command;

"1001" shows an extension number for turning on the message-waiting lamp; and "1002" shows a extension number for waiting the return message.

In step 2, converting section 31 calculates for calling a TAPI function corresponding to "FOSMWL ON 1001 1002" using ASCII-command-data-conversion table 34a.

To be more specific, converting section 31 calls the TAPI function lineDevSpecific (hline, dwAddressID, hCall, lpParams, dwSize) used for turning on the message-waiting lamp, and replace the command data with a code FDS [Field 3 C] 36 [EXT_SETMW] 3 [Field2 C] which is ready to be calculated. The command data calls the TAPI function corresponding to "MWLOn" using ASCII-command-data-conversion table 34a, and is replaced with FDS [Field 3 C] 36 [EXT_SETMW] 3 [Field2 C] which is ready to be calculated at converting section 31. "1001" and "1002" are stored respectively in "Field2 C" and "Field3 C", and command data is calculated as a data of a parameter or a "structure" which is passed to the TAPI function.

In step 3, TAPI function lineDevSpecific hline, dwAddressID, hCall, lpParams, dwSize is called.

In step 4, the TAPI function of TAPI section 32 is executed. TAPI section 32 reads necessary data such as "1001" shown in dwAddressOffset from data area 34b and calculates it.

In step 5, TAPI section 32 reads a TSPI function TSPI lineDevSpecific (DRVRequest, hline, dwAddressID, hCall, lpParams, dwSize) and substitutes actual parameter, then operates the TSPI function of TSP section 33. TSP section 33 executes the TSPI function TSPI lineDevSpecific (DRVRequest, hline, dwAddressID, hCall, lpParams, dwSize).

In step 6, as a result, TSP section 33 supplies the following command data written in a second ASCII code.

[1^:002061012F00010009010000000031303031020001080300090100000001313030032^]6F    (formula 1)

In step 7, PBX controller 26 turns on a message-waiting lamp of extension 1001.

Processes of informing "ON" of the message-waiting lamp of extension 1001 from PBX 2 to FOS management system 1 are described hereinafter. As shown in step 11 of FIG. 6, the following second-ASCII-command-data is informed from PBX 2 to format-converting device 3.

[0^:00274001FF000100090100010001313030310200010303000100040000C0001090100020001313030320004620023100^]C7    (formula 2)

In step 12, TSP section 33 receives the second-ASCII-command-data, and recognizes "ON" of the message-waiting lamp.

In step 13, TSP section 33 calls a CallBack function (hline, hCall, dwMsg, dwParam1, dwParam2, dwParam3), and sends the CallBack function to TAPI section 32.

In step 14, TAPI section 32 calls a CallBack function (hline, hCall, dwMsg, dwParam1), and sends the CallBack function to converting section 31.

In step 15, converting section 31 converts the CallBack function into a first-ASCII-command-data "PBXMWL ON 1001 1002" and sends the data to FOS management system 1.

As a result, "ON" of the message-waiting lamp of extension 1001 is informed to FOS management system 1.

Information produced at PBX 2 is converted from a second ASCII code to a first ASCII code, and controlled at FOS management system 1 as discussed above.

When TSP section 33 calculates an ASCII-command-data sent from PBX 2 as a TSPI function, a conversion table such as an ASCII-command-data-conversion table is produced, and the ASCII-command-data is replaced with a given function, then a TSPI function is called. As a result, format-converting device 3, which can use various kinds of PBX 2, is proposed.

Many modifications and variations of the present invention are possible in the light of the above techniques. It is therefore to be understood that within the scope of the invention, the invention may be practiced otherwise than as specifically described.

What is claimed is:

1. A format-converting device comprising:
(a) a first sending and receiving section for sending and receiving a first command data;
(b) a second sending and receiving section for sending and receiving a second command data between said format-converting device and a private branch exchange (PBX);
(c) a memory for storing a converting table, which brings the first command data into correspondence with a given function and stores the first command data and the given function, a telephony application programming interface (TAPI) function and a telephony service provider interface (TSPI) function;
(d) a converting section for referring to the converting table and calculating the given function corresponding to the first command data when said converting section receives the first command data, and for referring to the converting table and converting a data based on the second command data into the first command data when said converting section receives the data based on the second command data;
(e) a first calculating section for calculating the TAPI function; and
(f) a second calculating section for calculating the TSPI function,
wherein when said format-converting device receives the first command data, said first calculating section calculates based on a calculated result of said converting section, and then said second calculating section calculates based on a calculated result of said first calculating section, and then produces the second command data,
wherein when said format-converting device receives the second command data, said second calculating section calculates referring to said memory, and said first calculating section calculates based on a calculated result of said second calculating section, and said converting section supplies the first command data based on a calculated result of said first calculating section.

2. A format-converting device comprising:
(a) a receiving section for receiving a first command data;
(b) a memory for storing a converting table, which brings the first command data into correspondence with a given function and stores the first command data and the given function, a telephony application programming interface (TAPI) function and a telephony service provider interface (TSPI) function;
(c) a converting section for calculating the given function corresponding to the first command data of the converting table based on the first command data received;
(d) a first calculating section for calculating the TAPI function;
(e) a second calculating section for calculating the TSPI function;
(f) a controller for allowing said first calculating section to calculate based on a calculated result of said converting section, and for allowing said second calculating section to calculate based on a calculated result of said first calculating section, and for producing a second command data; and
(g) a sending section for sending the second command data to a private branch exchange (PBX).

3. The format-converting device of claim 2,
wherein the first command data and the second command data are written in one of different ASCII codes from each other and different binary codes from each other.

4. The format-converting device of claim 2,
wherein said converting section selects a given command data from the first command data received, and selects the TAPI function stored in said memory based on the given command data.

5. The format-converting device of claim 2, further comprising an input section for revising a command data stored in the converting table.

6. The format-converting device of claim 2, further comprising an input section for revising a parameter of a function stored in the converting table.

7. A format-converting device comprising:
(a) a sending section for sending a first command data;
(b) a receiving section for receiving a second command data from a private branch exchange (PBX);
(c) a converting section for sending the first command data to said sending section;

(d) a memory for storing a converting table, which brings a given command data into correspondence with a given function and stores the given command data and the given function, a telephony application programming interface (TAPI) function and a telephony service provider interface (TSPI) function;

(e) a first calculating section for calculating the TAPI function; and (f) a second calculating section for calculating the TSPI function;

wherein said second calculating section refers to the converting table based on the second command data, and calls the given TAPI function, wherein said first calculating section receives and calculates the given TAPI function, and calls the given function from said memory based on a calculated result of the given TAPI function, wherein said converting section then receives and calculates the given function, and supplies the first command data corresponding to the given function.

8. The format-converting device of claim 7, wherein the first command data and the second command data are written in one of different ASCII codes from each other and different binary codes from each other.

9. The format-converting device of claim 7, wherein said second calculating section recognizes the second command data, and selects a TAPI function which is stored in said memory and corresponds to the second command data.

10. The format-converting device of claim 7, further comprising an input section for revising a command data stored in the converting table.

11. The format-converting device of claim 7, further comprising an input section for revising a parameter of a function stored in the converting table.

12. A private branch exchange (PBX) system comprising:

(a) a control apparatus for performing a control function including a control function for an extension telephone;

(b) a receiving section for receiving a first command data from said control apparatus;

(c) a memory for storing a converting table, which brings the first command data into correspondence with a given function and stores the first command data and the given function, a telephony application programming interface (TAPI) function and a telephony service provider interface (TSPI) function;

(d) a converting section for calculating the given function corresponding to the first command data of the converting table based on the first command data received;

(e) a first calculating section for calculating the TAPI function;

(f) a second calculating section for calculating the TSPI function;

(g) a controller for allowing said first calculating section to calculate based on a calculated result of said converting section, and for allowing said second calculating section to calculate based on a calculated result of said first calculating section, and for producing a second command data;

(h) a sending section for sending the second command data; and (i) a private branch exchange (PBX) for receiving the second command data.

13. The PBX system of claim 12, further comprising an input section for revising a command data stored in the converting table.

14. The PBX system of claim 12, further comprising an input section for revising a parameter of a function stored in the converting table.

15. A format-converting method comprising the steps of:

(a) receiving a first command data;

(b) selecting a telephony application programming interface (TAPI) function from a converting table based on the first command data, which brings the first command data into correspondence with the given TAPI function and stores the first command data and the given TAPI function, and calculating the TAPI function;

(c) selecting a telephony service provider interface (TSPI) function based on a calculated result of the step (b);

(d) calculating the selected TSPI function based on a result of the first command data;

(e) producing a second command data based on a result of the step (d); and (f) sending the second command data.

16. The format-converting method of claim 15, wherein in step (b), a given command data is selected from the first command data referring to the converting table, then the selected TAPI function is recognized based on the given command data, and the selected TAPI function is calculated to be called.

17. A computer readable memory medium storing a program to allow a computer to execute a format-converting method, said method comprising the steps of:

(a) receiving a first command data;

(b) selecting a telephony application programming interface (TAPI) function from a converting table based on the first command data, which brings the first command data into correspondence with the given TAPI function and stores the first command data and the given TAPI function, and calculating the TAPI function;

(c) selecting a telephony service provider interface (TSPI) function based on a calculated result of the step (b);

(d) calculating the selected TSPI function based on a result of the first command data;

(e) producing a second command data based on a result of the step (d); and (f) sending the second command data.

18. The computer readable memory medium of claim 17, wherein in step (b), a given command data is selected from the first command data referring to the converting table, then the selected TAPI function is recognized based on the given command data, and the selected TAPI function is calculated to be called.

19. A format-converting method comprising the steps of:

(a) receiving a command data from a private branch exchange (PBX), and referring a converting table, and then calling a given telephony application programming interface (TAPI) function form a memory;

(b) receiving and calculating the given TAPI function, and calling a given function from the memory based on a calculated result of the given TAPI function; and (c) receiving and calculating the given function, and outputting another command data corresponding to the given function based on a calculated result of the given function.

20. The format-converting method of claim 19, wherein the first command data and the second command data are written in one of different ASCII codes from each other and different binary codes from each other.

* * * * *